(12) United States Patent
Singh et al.

(10) Patent No.: US 8,208,067 B1
(45) Date of Patent: Jun. 26, 2012

(54) AVOIDING JITTER IN MOTION ESTIMATED VIDEO

(75) Inventors: Harshdeep Singh, New Delhi (IN); Samreen Dhillon, Jalandhar-Punjab (IN)

(73) Assignee: Adobe Systems Incorporated, San Jose, CA (US)

( * ) Notice: Subject to any disclaimer, the term of this patent is extended or adjusted under 35 U.S.C. 154(b) by 1237 days.

(21) Appl. No.: 11/776,412

(22) Filed: Jul. 11, 2007

(51) Int. Cl.
*H04N 7/00* (2011.01)

(52) U.S. Cl. ........ 348/497; 348/578; 345/473; 345/474; 345/475; 386/343; 386/344; 386/345; 386/346; 386/347; 386/348; 386/349; 386/350; 386/351; 386/352

(58) Field of Classification Search .................. 348/497, 348/607, 441, 701, 620; 345/473–475; 386/278; 715/723
See application file for complete search history.

(56) References Cited

U.S. PATENT DOCUMENTS

| 6,424,789 | B1 * | 7/2002 | Abdel-Mottaleb | 386/278 |
| 2003/0077073 | A1 * | 4/2003 | Lin et al. | 386/68 |
| 2006/0055700 | A1 * | 3/2006 | Niles et al. | 345/473 |

OTHER PUBLICATIONS

Excerpts from "Adobe Premier Pro 1.5 for Windows: Visual QuickPro Guide" by Antony Bolante, Feb. 1, 2005.*
Young, Paul E., "Generating Transitions for Remapping Video Playback Time," pending U.S. Appl. No. 11/735,958, filed Apr. 16, 2007 (32 pgs), with figures (13 pgs).
Kuspa, David, et al., "Changing Video Playback Rate," pending U.S. Appl. No. 11/735,951, filed Apr. 16, 2007 (40 pgs), with figures (13 pgs).
Kuspa, David, "Indicating Different Video Playback Rates," pending U.S. Appl. No. 11/735,945, filed Apr. 16, 2007 (29 pgs), with figures (13 pgs).
http://vfwtech.com/Liquid/Tutorials_pinnacle.htm, vfwTech.com & Softwright, Inc., Avid Liquid User's Group of Colorado, Apr. 15, 2007, Pinnacle Free Tutorials for Liquid Edition (5 pgs).
http://www.apple.com/lae/finalcutpro/editing.html, Razor-sharp tools, time remapping and mode-free editing, Jan. 26, 2007, 2003 Apple Computer (2 pgs).
Liquid Edition 5.5—Product Comparison, World Class Color Correction, Pinnacle Systems (8 pgs).
http://www.adobe.com/designcenter/premiere/articles/prn15sddifspeed.html, Adobe Design Center Tutorial Altered rates: Varying playback speed, Feb. 1, 2005 (4 pgs).
Adobe Premiere Pro 2.0 User Guide, Changing clip attributes, publication page and pp. 157-158, 2005.

* cited by examiner

*Primary Examiner* — Jeffrey Harold
*Assistant Examiner* — Sam Huang
(74) *Attorney, Agent, or Firm* — Fish & Richardson P.C.

(57) ABSTRACT

A method includes receiving a digital video segment simulating motion at one speed, the frames in the segment spaced at a uniform time interval. The method further includes receiving a desired speed of motion, determining the appropriate uniform time interval corresponding to the desired speed, and generating a frame sequence simulating the motion at the desired speed, the frames in the generated sequence spaced at the determined appropriate uniform time interval. If the generated frame sequence includes a frame from the original segment, then only frames from the original segment are included in the generated frame sequence, and if the generated frame sequence includes an interpolated frame then only interpolated frames are included in the generated frame sequence.

23 Claims, 5 Drawing Sheets

AVOIDING JITTER IN MOTION ESTIMATED VIDEO

BACKGROUND

The present disclosure relates generally to digital video editing, and more specifically to avoiding jitter in motion estimated video.

When editing a segment of digital video, motion estimation techniques may be used to simulate the motion portrayed in the video segment at a faster speed or a slower speed. For example, 60 frames of video played at 30 frames per second may portray the motion of a baseball from point A to point B in two seconds. To portray the same motion of the baseball from point A to point B at half the speed of the original video, the 60 frames may be played at 15 frames per second for four seconds. In some circumstances, slowing the frame rate may be undesirable, such as when only a portion of the video is to be altered. Also, the slower frame rate may produce choppy motion. One way to overcome these and other undesirable aspects is to insert an interpolated frame between each of the 60 original frames. The position of the baseball in each interpolated frame is estimated based on its position in the original reference frames. The resulting approximately 120 frames, when played at the original 30 frames per second for approximately four seconds, will portray the motion of the baseball from point A to point B at half the speed of the original video.

Interpolated frames are generated using motion estimation techniques. When a frame at relative time 1.x ("frame 1.x") is needed between a reference frame at relative time 1.0 ("frame 1.0") and a reference frame at relative time 2.0 ("frame 2.0"), forward and backward motion vectors may be calculated between frame 1.0 and frame 2.0. Frame 1.0 may be warped to relative time 1.x using the forward motion vectors, and frame 2.0 may be warped to the relative time 1.x using the backward motion vectors. The resulting images may then be blended together.

SUMMARY

This specification describes technologies relating to avoiding jitter in motion estimated video. Because the images portrayed in interpolated video frames are estimated rather than exact, these images are slightly less sharp than the images portrayed in the reference frames used for the interpolation. This blurring is usually so slight that it is virtually undetectable in video segments comprising only interpolated frames. However, a segment of digital video comprising original frames interspersed with interpolated frames, i.e., sharp frames interspersed with slightly blurred frames, will produce a detectable jitter effect when played. In the example set forth in the background section, although the motion of the baseball is displayed at the desired slower speed, the undesired jitter effect is introduced because interpolated frames are interspersed with original frames.

In general, one aspect of the subject matter described in this specification can be embodied in a method that includes receiving a digital video segment simulating motion at one speed, the frames in the segment spaced at a uniform time interval. The method further includes receiving a desired target speed at which to simulate the motion, determining the appropriate uniform time interval corresponding to the desired speed, and generating a digital video segment including a frame sequence simulating the motion at the desired speed, the frames in the generated sequence spaced at the determined appropriate uniform time interval. If the generated frame sequence includes a frame from the original segment, then only frames from the original segment are included in the generated frame sequence. Other embodiments of this aspect include corresponding systems, apparatus, and computer program products.

These and other embodiments can optionally include one or more of the following features. The target speed can be input as a proportionality constant relating the target speed to the first speed. If the proportionality constant is an integer, then the generated frame sequence includes only frames from the original segment. If the proportionality constant is equal to one, then the generated video segment is the same as the original video segment. If the proportionality constant is not an integer, then the generated frame sequence includes no frames from the original segment. In addition to the generated frame sequence, the generated video segment can optionally include the first frame from the original segment and/or the last frame from the original segment. The original and generated segments can be configured for playback at the same frame rate even when simulating the motion at different speeds. The generated frame sequence can include interpolated frames, where the position of the object in an interpolated frame is estimated based on the object's position in two or more original frames.

Consecutive frames from the original segment can represent the position of an object or objects at moments in time separated by the original uniform time interval, and consecutive frames in the generated sequence can represent the position of the same object at moments in time separated by the determined appropriate target time interval. The first frame in the generated sequence can represent the object's position at an initial target time offset from the first frame in the original segment. The initial target time offset can be equal to the target time interval adjusted by an adjustment value. The adjustment value can be equal to $s*(s-1)$, where s is the absolute value of the fractional portion of a nonzero proportionality constant relating the target speed to the original speed. If the adjustment value is not zero, then each target frame represents the object's position at a different time from each original frame.

Another aspect of the subject matter described in this specification can be embodied in a method that includes receiving a digital video segment, the frames in the segment depicting the motion of an object from a start time to an end time in uniform time increments. The method further includes receiving input relating to a target time increment and generating a video segment including a frame sequence depicting the motion of the object between the same start and end times in the target time increments. If the target time increment is a multiple of the time increment separating the frames in the original video segment, then each frame in the generated frame sequence is also in the original frame sequence. If the target time increment is not a multiple of the time increment separating the frames in the original video segment, then no frame in the generated frame sequence is also in the original frame sequence. Other embodiments of this aspect include corresponding systems, apparatus, and computer program products.

These and other embodiments can optionally include one or more of the following features. If the target time increment is equal to the original time increment, then the two video segments are identical. The generated video segment can include the first and/or last frame from the original segment. The first frame in the generated sequence can depict the object at a target frame start time equal to the start time plus the target time increment plus an adjustment value. The adjustment value can range from −0.25 to 0.

Particular embodiments of the subject matter described in this specification can be implemented to realize one or more of the following advantages. Video segments edited to simulate faster or slower motion using motion estimation techniques will not produce a jitter effect when played, because interpolated frames will not be interspersed with non-interpolated frames. An offset adjustment algorithm provides that if the requested speed is not an integer multiple of the original video speed, then the time represented by each interpolated frame will not coincide with the time represented by any original reference frame, preventing the interspersing of non-interpolated frames among the interpolated frames in the resulting video segment. The offset adjustment algorithm also provides that if the requested speed is an integer multiple of the original video speed, then only non-interpolated frames (i.e., original frames) are used in the resulting video segment and no interpolated frames are used. If the requested speed is the same as the original speed, then the resulting video segment is the same as the original video segment. The offset adjustment algorithm works for any desired speed adjustment. The offset adjustment algorithm can be computed quickly. The offset adjustment algorithm does not produces an offset adjustment greater than 25 percent of the elapsed time between consecutive original frames.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
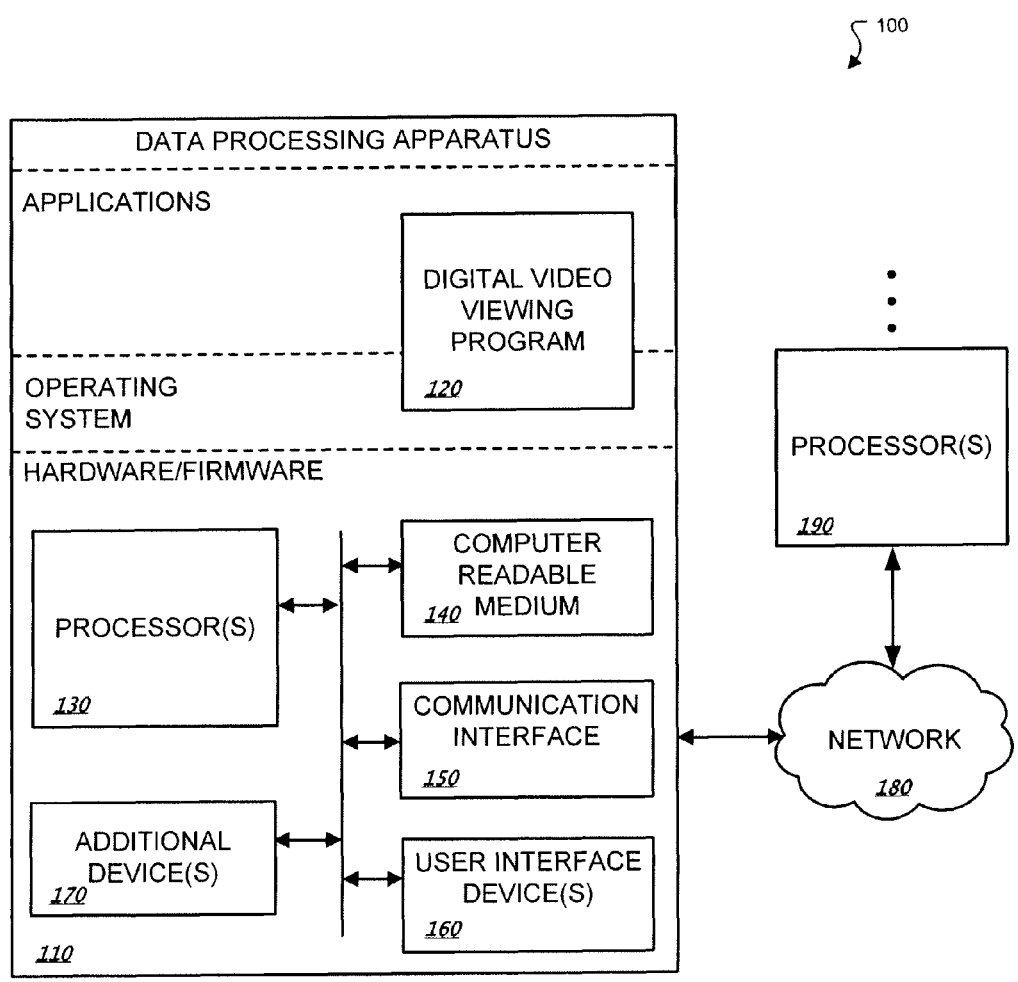
FIG. 1 shows an example system used to change perceived speed of motion in a digital video segment.

FIG. 1 shows an example system 100 used to view digital video at a variable perceived speed of motion (e.g., accelerated motion, reverse accelerated motion, slow motion, or reverse slow motion) and/or modify digital video content to be portrayed at a different speed than the original. A data processing apparatus 110 can include hardware/firmware, an operating system and one or more programs, including a digital video viewing program 120. The video viewing program 120 operates, in conjunction with the data processing apparatus 110, to effect various operations described in this specification. Thus, the program 120, in combination with processor(s) and computer-readable media (e.g., memory), represents one or more structural components in the system.

The video viewing program 120 can be a digital video viewing application, a video editing application, or a portion thereof. As used herein, an application refers to a computer program that the user perceives as a distinct computer tool used for a defined purpose. An application can be built entirely into the operating system (OS) of the data processing apparatus 110, or an application can have different components in different locations (e.g., one portion in the OS or kernel mode, one portion in the user mode, and one portion in a remote server), and an application can be built on an application execution environment (e.g., a virtual machine or a runtime library that provides various utility services to applications) serving as a software platform of the apparatus 110. Moreover, an application can be a graphical user interface application (e.g., a Web browser) that connects to one or more processors 190 (e.g., one or more Web servers) over a data communication network 180 (e.g., the Internet) and provides the computer tool as a network service. In some implementations, one or more portions of the application can be calculated within hardware circuitry.

The video viewing program 120 can include (or be included in) various types of software that focus on different types of image processing, such as visual effects, image editing and video editing (e.g., Adobe® After Effects® software, Adobe® Photoshop® software, or Adobe® Premiere® software, each available from Adobe Systems Incorporated of San Jose, Calif.). Thus, the video viewing program 120 can operate on digital images from many different sources and can be directed to various image processing workflows. Moreover, digital video (which for brevity will simply be referred to as video) does not necessarily correspond to a file. Video can be stored in a portion of a file that holds other video and images, in a single file dedicated to a given video clip, or in multiple coordinated files.

The data processing apparatus 110 includes one or more processors 130 and at least one computer-readable medium 140 (e.g., random access memory, storage device, etc.). The data processing apparatus 110 can also include a communication interface 150, one or more user interface devices 160, and one or more additional devices 170. The user interface device(s) 160 can include display screen(s), keyboard(s) (e.g., a custom video editing keyboard), mouse, stylus, or any combination thereof. Moreover, the data processing apparatus 110 can itself be considered a user interface device (e.g., when the video viewing program 120 is delivered as a Web service).

The additional device(s) 170 can include various devices used for video and film viewing and/or editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium.

In some implementations, the video viewing program 120 can be provided within a video player (e.g., DVD player), portable digital video viewing device (e.g., PDA, cellular phone, portable media player), a digital video recording device (e.g., digital camera, digital video recorder, etc.) or any other electronic device capable of playing digital video content.

Figure 2:
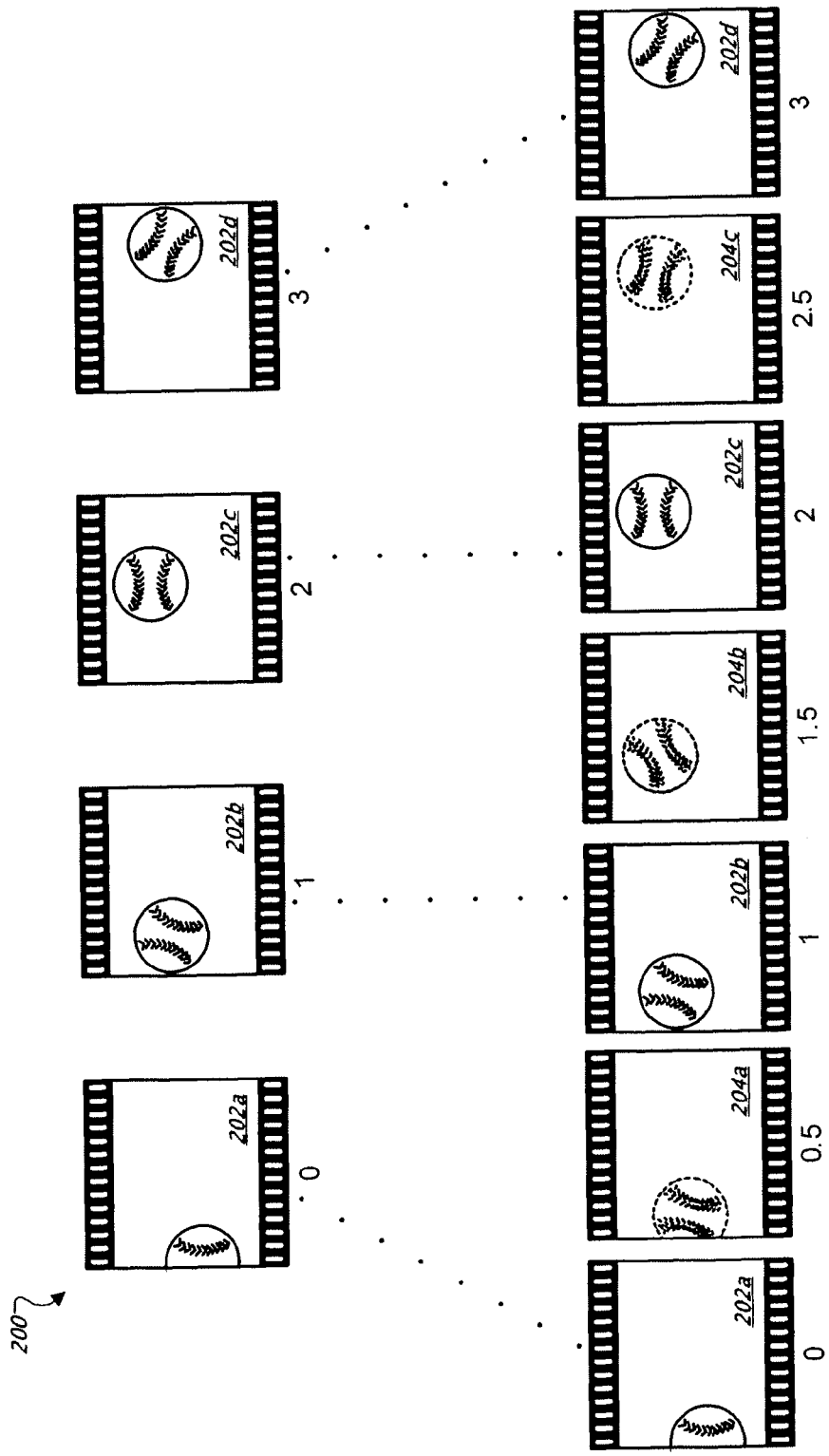
FIG. 2 shows an example illustration for changing the perceived speed of motion of a video segment, as can be implemented using the system of FIG. 1.

FIG. 2 shows an example illustration 200 for changing the perceived speed of motion of a video segment, as can be implemented using the system of FIG. 1. A user interface, in some implementations, can be provided including a control for modifying the perceived speed of motion. For example, forward and reverse buttons such as those found on a remote control device can be used, in some implementations, to control the perceived speed and direction of objects in the video playback. In the example given, the motion is being slowed to half speed. To provide a coherent video presentation at an adjusted speed, video frames are motion interpolated and introduced between the original video frames. The motion interpolation can be done, for example, by image processing software and/or hardware included in or used in conjunction with the digital video viewing program 120.

A sequence of primary video frames 202 contains respective frames within a relative time sequence {0, 1, 2, 3} of digital video footage portraying a baseball in motion. Primary frames are also described herein as original frames, although the term original does not imply that the frames have never been modified from their initial configuration. Each video frame in sequence 202 contains an image of the baseball at a different location within the field of view. Frame 202a depicts the baseball at relative time 0, frame 202b depicts the baseball at relative time 1, frame 202c depicts the baseball at relative time 2, and frame 202d depicts the baseball at relative time 3. The sequence of primary video frames 202 can, for example, be a portion of a video of a baseball game in which the camera is following a ball after it connected with a bat. The baseball appears to be moving from the right side of the field of view to the left side of the field of view within the frame sequence 202. Although only four frames are represented in frame sequence 202, a video segment would typically contain a much longer frame sequence containing many additional frames.

When the motion represented in the digital video segment is slowed down to half its original speed, it takes twice as long to watch the baseball travel from its location in the first frame 202a to its location in the last frame 202d. If this is accomplished, for example, by displaying each frame in primary sequence 202 for twice as long, the video segment will appear choppy to a viewer. To smooth out the appearance of the video segment, a sequence of interpolated frames 204 can be introduced within the primary video frame sequence 202. Sequence 204 is introduced to estimate the location of the baseball within the field of view at relative points in time {0.5, 1.5, 2.5} in addition to relative points in time {0, 1, 2, 3} portrayed by the primary video frame sequence 202. Frame 204a depicts the baseball at relative time 0.5, frame 204b depicts the baseball at relative time 1.5, and frame 204c depicts the baseball at relative time 2.5. Introducing the new frames 204a, 204b, and 204c can slow the perceived speed of motion while displaying a smoothly transitioning sequence. For example, if the original video frame sequence 202 is recorded at a frame rate of 25 frames/second, and if the original video frame sequence is expanded to 25 total frames, then interpolated frames are interspersed with the original video frames in sequence 202 to expand the sequence to approximately fifty total frames. In viewing the approximately fifty frames at the same frame rate of 25 frames/second, the same action which had taken one second to view at original speed will now take two seconds to view.

The frames introduced in frame sequence 204 represent estimations of the position of the baseball not captured in frame sequence 202 of original video. Motion vectors, for example, can be calculated between two consecutive primary frames to estimate the position of the baseball as it would have occurred at a time somewhere between the consecutive frames. Because the interpolated frames in sequence 204 are estimated, they lack the clarity of the original frames in sequence 202. As shown in FIG. 2, the interpolated frames 204a, 204b, and 204c contain motion estimations at the point in time directly between consecutive frames in sequence 202. The lines are blurred in the baseballs portrayed within the interpolated frames. Interspersing the interpolated frames with the original frames can lead to the perception of jitter when viewed, because sharp and blurred images are being intermixed in the display.

Adjusting to different perceived speeds of motion can introduce more than one interpolated frame between consecutive original frames in a frame sequence. For example, if the perceived speed of motion in frame sequence 202 is adjusted to one quarter of the original speed, three interpolated frames are introduced between frames 202a and 202b, one at relative time 0.25, one at relative time 0.5, and one at relative time 0.75. Similarly, three interpolated frames are introduced between frames 202b and 202c, and three interpolated frames are introduced between frames 202c and 202d.

In addition to slowing the perceived speed of motion, the frame sequence 202 could be adjusted, in some implementations, to achieve a perceived acceleration of motion. In the case of integer acceleration (e.g., 2×, 3×), frames could be dropped intermittently to produce the resultant accelerated video sequence. For example, to show the motion portrayed in frame sequence 202 at twice its speed using the same frame rate, every other frame could be displayed. If, instead, a fractional acceleration is desired (e.g., 1.3×, 2.5×), interpolated frames can be used to adjust the output video sequence.

Adjusting the perceived speed of motion in a digital video segment can involve the calculation of target frame times. Target frame times are those times for which a frame is needed to portray motion at a desired speed. For example, if the motion simulated by primary sequence {0, 1, 2, 3}, representing frame times of 0, 1, 2, and 3, is slowed by 40%, the result is target sequence {0, 0.4, 0.8, 1.2, 1.6, 2, 2.4, 2.8}, representing target frame times of 0, 0.4, 0.8, 1.2, 1.6, 2, 2.4, and 2.8. Frame time 2 appears in both the primary sequence and the target sequence, resulting in a primary frame appearing among the interpolated frames in the target sequence. To eliminate any possibility of the jitter effect as discussed in FIG. 2, an adjustment can be calculated and applied to the target frame times to provide that primary frames will not be interspersed with interpolated frames.

Figure 3:
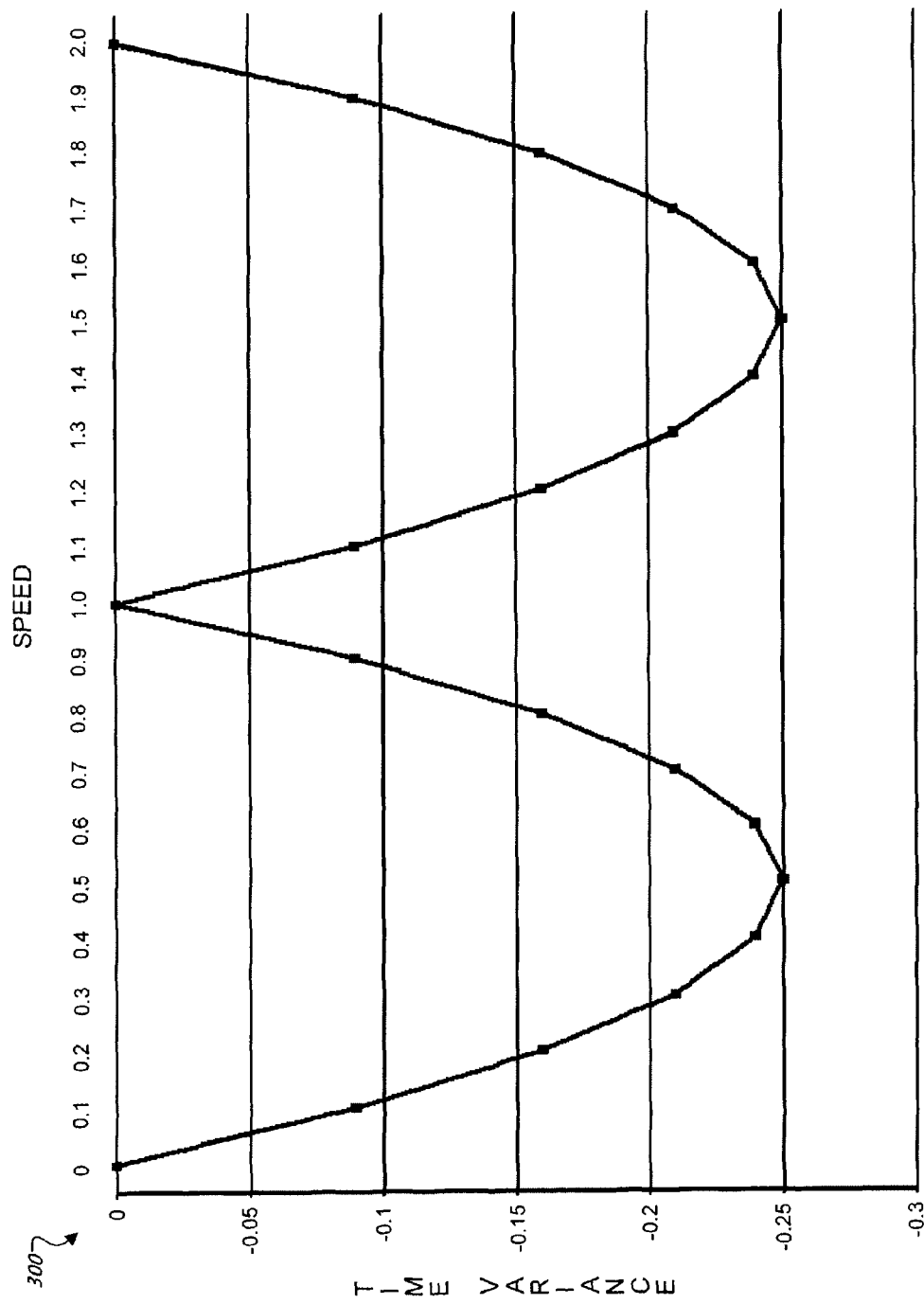
FIG. 3 shows a graph of an algorithm for calculating an adjustment to target frame times for a digital video segment.

FIG. 3 shows a graph 300 of an algorithm for calculating an adjustment to target frame times for a digital video segment. Adjustments can be applied to target frame times to avoid interspersing primary frames with interpolated frames in a target sequence, thereby preventing jitter in interpolated motion sequences. The x-axis of the graph 300 charts speed. In this case, speed refers to the absolute value of speed, because the video could be played in the forward or reverse direction. Fractional speeds of a value less than 1.0 refer to slowing down the perceived motion of the video. For example, a speed of 0.5 relates to slowing the motion to half speed. Speeds of a value greater than 1.0 relate to accelerating the perceived motion of the video. The x-axis of graph 300 ranges from stopped (e.g., speed of zero) to double the speed of the original video (e.g., speed value of two). The y-axis tracks time variance. The time variance represents the adjustment value applied to each target frame time.

The input value to the algorithm graphically displayed within FIG. 3 is the target relative speed s. For example, s=0.4 correlates to a 40% slow down in the perceived speed of motion in the video. The absolute value of the target speed input is used by the algorithm, because the video could be played in either the forward or reverse direction:

if $(s=0), s=-s$

Only the fractional portion of the target speed input is used in calculating the adjustment:

$$s = s - \text{floor}(s)$$

In other words, the non-fractional portion of the target speed s can be dropped for purposes of determining the adjustment value. The adjustment value can be the same whether the target speed input s is 0.4 or 1.4.

The adjustment value generated by the algorithm can be applied to the frame time of each frame in the target sequence. For example, consider an original sequence of frames {0, 1, 2}. When the perceived rate of motion of the series is slowed by 40% (e.g., s=0.4), the motion adjusted frame times for the target sequence become {0, 0.4, 0.8, 1.2, 1.6, 2}. Note that the final frame in the target sequence has an integer value frame time of 2. While interpolating frames, the original frame correlating to time 2 would be copied over. In continuing the sequence, this could cause the perception of jitter.

If all frames in the series are interpolated, each frame is blurry and there is no jitter caused by the contrast of sharp frames interspersed with blurry frames. If all frames are primary frames, no frame is blurry and there is also no jitter. To calculate the offset adjustment value, the following algorithm can be used:

$$\text{offset\_adjustment\_value} = s*(s-1)$$

The target frame times can be modified by the offset adjustment to calculate the adjusted target frame times:

$$\text{frame\_time} = \text{frame\_time} + \text{offset\_adjustment\_value}$$

Using the target speed input of s=0.4, the offset adjustment value is calculated as −0.24. Applied to the 40% reduction in perceived motion sequence {0, 0.4, 0.8, 1.2, 1.6, 2.0}, the adjusted target sequence is {−0.24, 0.16, 0.56, 0.96, 1.36, 1.76}. For any speed value s and original integer-based time series n, applying the calculated adjustment value to the motion-adjusted sequence will result in a non-integer frame time. Mathematically, for $n$=integer, $s$=non-integer, $n*s+s^2-s$ is not an integer.

In other words, for any fractional value s, the adjusted frame time will not align with an original frame time.

While applying the adjustment, it should be noted that frame time can not be less than zero. A zero value of frame time correlates to the beginning of the digital video feed. If a frame time is calculated to be less than zero, it is then set to zero. Using the example above, the adjusted target sequence is now {0, 0.16, 0.56, 0.96, 1.36, 1.76}. A sharp primary frame at the beginning or the end of a sequence of interpolated frames will not produce a jitter effect. It is the interspersing of sharp frames among blurry frames that produces jitter.

For any target speed s, the parabolic path of the adjustment value graph repeats. The largest adjustment value will be −0.25. When there is no speed modification (e.g., s=1), no offset adjustment value is applied. When the speed is accelerated by an integer multiplier, no offset adjustment value is applied. For example, when the perceived motion is accelerated by double (e.g., s=2), every other frame of the original sequence can be dropped. In such a case, interpolation is not necessary.

When the perceived motion is accelerated by a fractional amount, the adjustment can be applied as described above. In one example, the target speed input s=1.5, correlating to a perceived motion acceleration of 1.5 times the original video sequence. Taking the original sequence {0, 1, 2, 3, 4, 5, 6}, the adjusted sequence is {0, 1.5, 3, 4.5, 6}. The calculated adjustment, using the algorithm previously described, is −0.25, resulting in the adjusted target sequence {0, 1.25, 2.75, 4.25, 5.75}. In some implementations, a sequence can run in reverse order. For example, the sequence {5, 4, 3, 2, 1, 0} relates to a video segment played in reverse motion. In addition, a sequence can begin and/or end in a time value other than zero. This could occur, for example, when the perceived speed of motion is being adjusted in the middle of a video segment.

Figure 4:
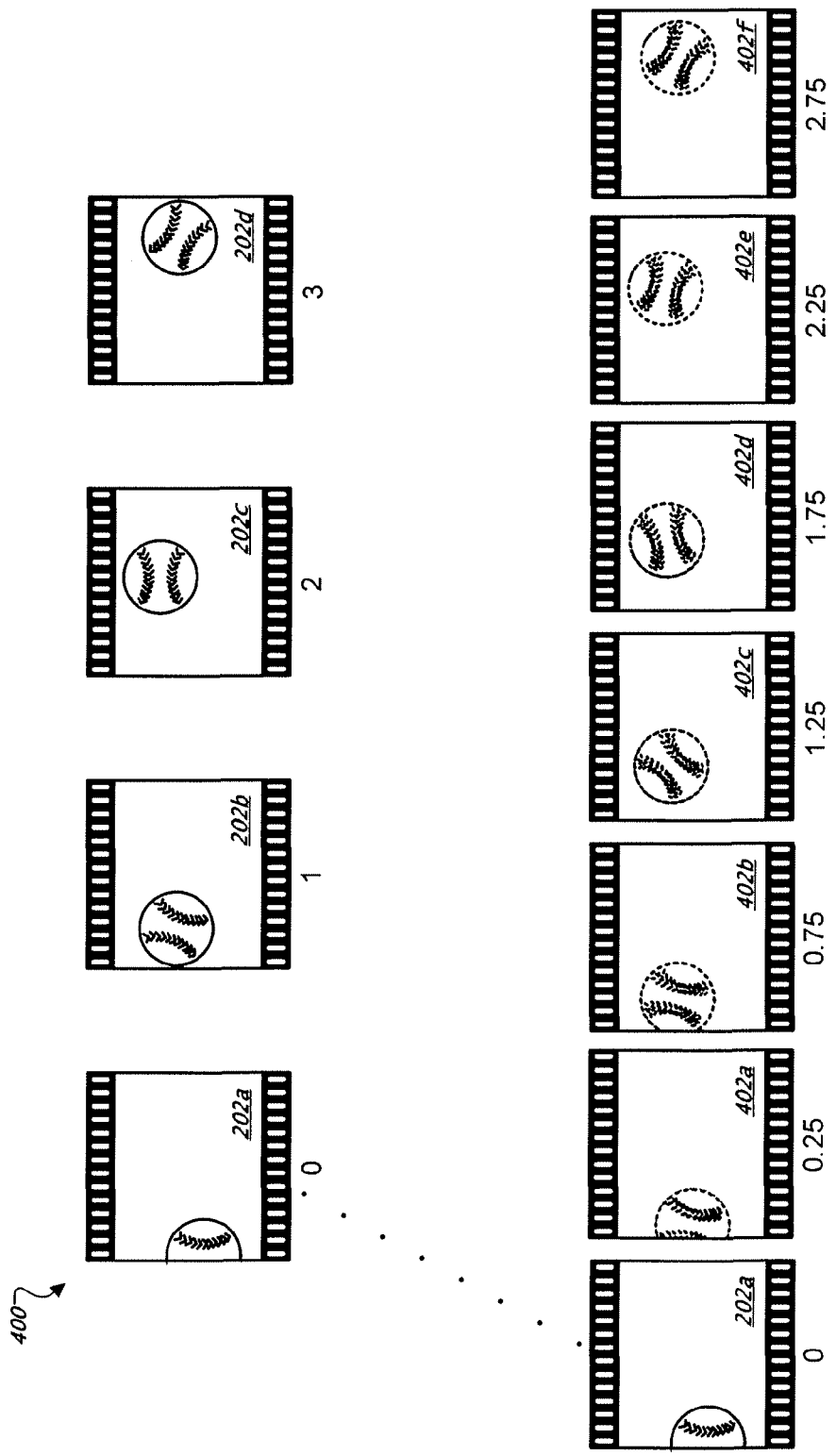
FIG. 4 shows an example illustration for changing the perceived speed of motion of a video segment, as can be implemented using the system of FIG. 1 with the algorithm of FIG. 3.

FIG. 4 shows an example illustration 400 for changing the perceived speed of motion of a video segment, as can be implemented using the system of FIG. 1 with the algorithm of FIG. 3. As in the illustration 200 in FIG. 2, the primary sequence {0, 1, 2, 3} is being slowed down to half the original speed. The original frames in sequence 202 are illustrated at the top of the diagram. The frames in sequence 202 portray a baseball in motion. As with FIG. 2, the frames in sequence 202 will be modified to alter the perceived speed of motion by half.

The first primary frame 202a, at frame time zero, begins the motion adjusted video segment at the bottom of the diagram. A target sequence 402 follows frame 202a, and each frame 402a through 402f has been generated using motion estimation techniques for the adjusted frame time calculated using the algorithm described within FIG. 3. Frame 402a depicts the baseball at relative time 0.25, frame 402b depicts the baseball at relative time 0.75, frame 402c depicts the baseball at relative time 1.25, frame 402d depicts the baseball at relative time 1.75, frame 402e depicts the baseball at relative time 2.25, and frame 402f depicts the baseball at relative time 2.75.

For example, beginning with the original frame sequence 202 {0, 1, 2}, the half motion input time sequence, using the target speed input of s=0.5, is {0, 0.5, 1, 1.5, 2.0}. Applying the algorithm frame_time=frame_time+s*(s−1) as described in FIG. 3, the adjusted target sequence becomes {0, 0.25, 0.75, 1.25, 1.75}. Using the adjusted target frame times, interpolated frames 402a, 402b, 402c, 402d, 402e, and 402f are created. Every frame in target sequence 402 is motion estimated, and the image contained within each frame in sequence 402 is blurry. When the frames in sequence 402 are played at the playback rate (e.g., 24 frames per second, 30 frames per second, etc.), no jitter should be apparent.

Figure 5:
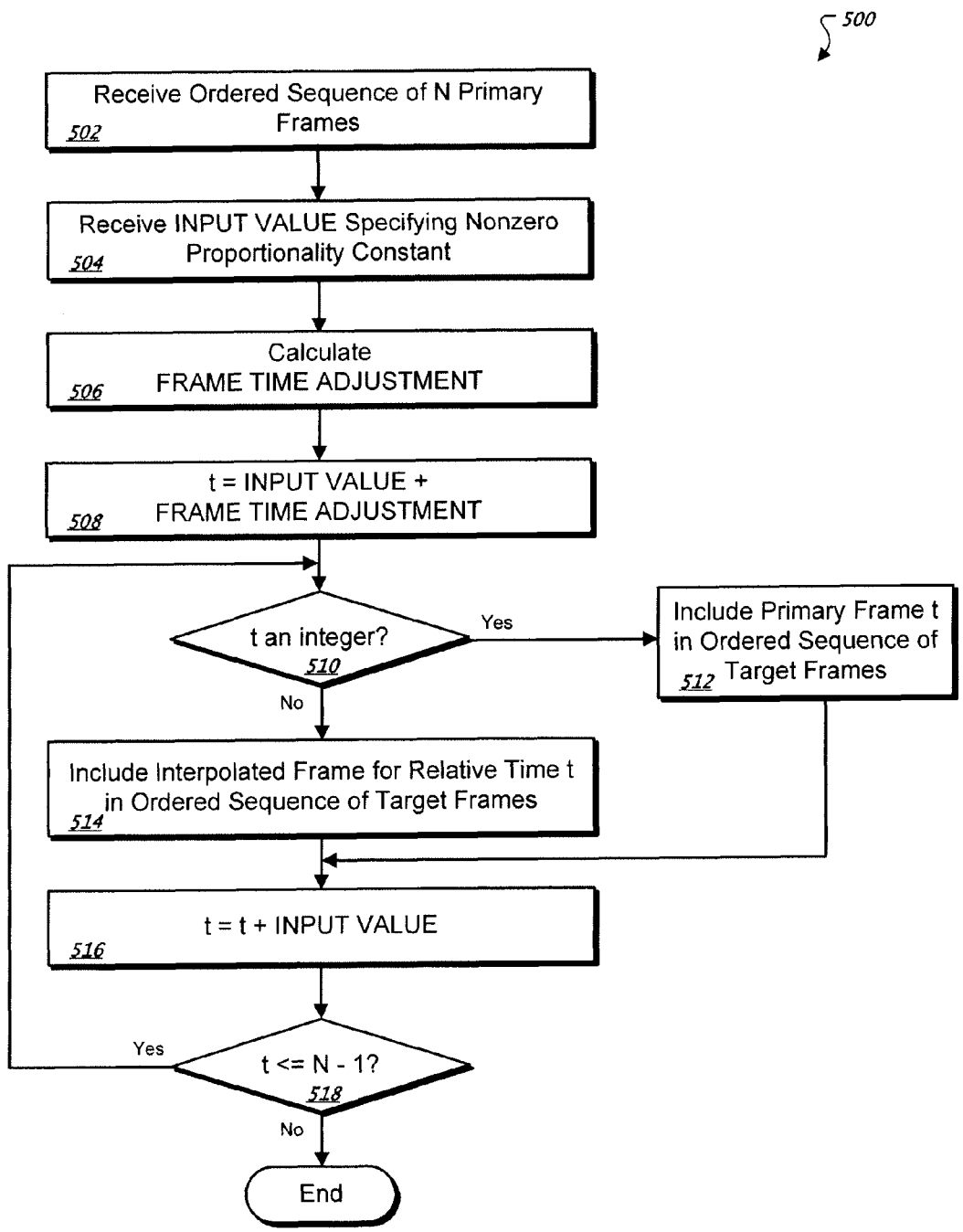
FIG. 5 is a flow diagram illustrating an example method for adjusting the perceived speed of motion in a video segment in the forward direction.

FIG. 5 is a flow diagram illustrating an example method 500 for adjusting the perceived speed of motion in a video segment in the forward direction. The video segment depicts the motion of one or more objects from a start time to an end time in uniform time increments, and consists of an ordered sequence of primary frames received in step 502. There are N primary frames in the ordered sequence, and for reference purposes herein the frames are numbered consecutively from 0 to N−1. Primary frame 0 captures an image at start time 0, primary frame 1 captures the image at time 1, primary frame 2 captures the image at time 2, and primary frame N−1 captures the image at end time N−1.

In step 504, an input value is received specifying a nonzero proportionality constant. In some implementations, the input value is received from a user, for example through interacting with a graphical user interface for modifying the perceived motion of a video. The user could choose, for example, to play a video in slow motion, slow reverse motion, accelerated motion, or accelerated reverse motion. The proportionality constant represents how the user wishes to modify the perceived speed of motion in the received video segment. For example, a proportionality constant of 0.5 indicates that the user wishes to slow the motion of the video to half the original speed, while a proportionality constant of 2.0 indicates that the user wishes to accelerate the motion of the video to twice the original speed.

Using the input value received, a frame time adjustment value is calculated at step 506. The frame time adjustment value can be used to generate a target frame start time at step 508. The frame time adjustment value is based on the input value, and can be calculated as follows:

$$\text{frame\_time\_adjustment\_value} = |s - \text{floor}(s)| * (|s - \text{floor}(s)| - 1)$$

For example, an input value of 1.5 indicates that the user wishes to view the motion depicted in the video sequence at 150% of the original speed. An input value of 1.5 produces a frame time adjustment value of −0.25. As another example, an input value of 0.6 indicates that the user wishes to view the motion depicted in the video sequence at 60% of the original speed. An input value of 0.6 produces a frame time adjustment value of −0.24.

The frame time adjustment value can be added to the input value to generate t, which at step 508 is the target frame start time. A loop can then be entered which will generate an ordered sequence of target frames for inclusion in a second digital video segment that will depict the motion from the first digital video segment at the requested adjusted speed. Generating the ordered sequence of target frames may involve selecting existing frames for inclusion in the sequence, creating frames using motion estimation or other techniques, determining that an existing sequence qualifies as the target sequence, or any other activity resulting in the creation or identification of the target sequence. At step 510, if t is an integer, then primary frame t is included in the ordered sequence of target frames at step 512. The frame time adjustment value provides that if t is ever an integer, resulting in the execution of step 512, then t is always an integer. This can occur when the input value is an integer.

At step 510, if t is not an integer, then an interpolated frame capturing the image at time t is included in the ordered sequence of target frames at step 514. The frame time adjustment value provides that if t is ever not an integer, resulting in the execution of step 514, then t is never an integer. This can occur when the input value is not an integer. In some implementations, interpolation may occur at step 514. In some implementations, the interpolated frame may be retrieved from storage if the interpolation occurred previously and the resulting frame was stored.

The first time through the loop, a frame depicting the image at the target frame start time is included as the first frame in the ordered sequence of target frames. At step 516, t is incremented by the input value and represents the frame time for the next frame in the ordered sequence of target frames. The value t is tested at step 518, and the loop repeats until t specifies a time beyond the time boundary of the original segment, causing the test at step 518 to fail. At that time, the ordered sequence of target frames is fully generated.

Example method 500 for adjusting the perceived speed of motion in a video segment in the forward direction can be adjusted for the reverse direction by modifying steps 508 and 518. In particular, in addition to adding the frame time adjustment value to the input value to determine the initial target frame start time, the number of primary frames N is also added at step 508. Each execution of the loop 510 through 518 results in a smaller value of t. The loop is executed as long as t is greater than zero at step 518.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
receiving a first digital video segment configured to simulate motion at a first speed, the first digital video segment including an ordered sequence of primary frames, each consecutive primary frame spaced at a first time offset from a previous primary frame, wherein each primary frame in the ordered sequence of primary frames corresponds to a primary time slot along a video timeline;
receiving an input value specifying a target speed, wherein the target speed is proportional to the first speed and the input value specifying the target speed comprises a nonzero proportionality constant relating the target speed to the first speed;
determining a target time offset related to the target speed;
determining a target frame adjustment value based on the target speed; and
generating a second digital video segment configured to simulate the motion at the target speed, the second digital video segment including an ordered sequence of target frames, each consecutive target frame spaced at the target time offset from the previous target frame and each consecutive target frame generated by interpolation from the primary frames based on the target time offset and the target frame adjustment value, wherein the target frame adjustment value is selected to prevent the ordered sequence of target frames from including a primary frame and each target frame in the ordered sequence of target frames corresponds to a target time slot along the video timeline, with each target time slot offset from at least one primary time slot by the target frame adjustment value plus a multiple of the target time offset.

2. The method of claim 1, wherein each consecutive primary frame represents a position of at least one object at the first time offset from the previous primary frame, and wherein each consecutive target frame represents a position of the at least one object at the target time offset from the previous target frame.

3. The method of claim 2, wherein the first target frame in the ordered sequence of target frames represents a position of the at least one object at an initial target time offset from the first primary frame in the ordered sequence of primary frames, wherein the initial target time offset is equal to the target time offset plus the target frame adjustment value.

4. The method of claim 3, wherein the adjustment value is equal to $s*(s-1)$, wherein s is equal to the absolute value of a fractional portion of a nonzero proportionality constant relating the target speed to the first speed.

5. The method of claim 3, wherein each target frame in the ordered sequence of target frames represents a position of the at least one object at a different time from each primary frame.

6. The method of claim 3, the second digital video segment further including the first primary frame followed by the ordered sequence of target frames.

7. The method of claim 2, wherein the position of at least one object in at least one target frame is estimated based on the position of the at least one object in at least two primary frames.

8. The method of claim 1, wherein the first digital video segment and the second digital video segment are configured for playback at the same frame rate.

9. The method of claim 8, wherein the first speed is different from the target speed.

10. The method of claim 1, wherein the ordered sequence of target frames includes no primary frames, and wherein the second digital video segment further comprises a last primary frame in the ordered sequence of primary frames.

11. The method of claim 1 wherein the target frame adjustment value is selected such that no target frame comprises a primary frame.

12. A computer program product, encoded on a computer-readable medium, operable to cause data processing apparatus to perform operations comprising:
   receiving a first digital video segment including a plurality of sequential primary frames depicting the motion of an object from a start time to an end time in uniform time increments of a first time increment, wherein each primary frame corresponds to a primary time slot along a video timeline;
   receiving input indicating a target time increment, wherein the target time increment is proportional to the first time increment; and
   generating a second digital video segment depicting the motion of the object between the start time and the end time, the second digital video segment including a plurality of sequential target frames depicting the motion in uniform time increments of the target time increment, wherein the target time increment does not comprise a multiple of the first time increment, each target frame in the plurality of sequential target frames corresponds to a target time slot along the video timeline, and a target time slot adjustment value is used to generate target frames, with each target time slot offset from at least one primary time slot by the target time slot adjustment value plus a multiple of the target time increment.

13. The computer program product of claim 12, the second digital video segment further comprising the primary frame depicting the object at the start time.

14. The computer program product of claim 12, the second digital video segment further comprising the primary frame depicting the object at the end time.

15. The computer program product of claim 12, the operations further comprising:
   calculating a target frame start time equal to the start time plus the target time increment plus the target time slot adjustment value, a first frame in the plurality of sequential target frames depicting the object at the target frame start time.

16. The computer program product of claim 15, wherein the target time slot adjustment value is a rational number ranging from −0.25 to 0, inclusive.

17. The computer program product of claim 12 wherein the target time slot adjustment value is selected such that no target frame comprises a primary frame.

18. A system comprising:
   a user interface device; and
   one or more computers operable to interact with the user interface device and to:
      receive a first digital video segment including a plurality of sequential primary frames depicting the motion of an object from a start time to an end time in uniform time increments of a first time increment, wherein each primary frame corresponds to a primary time slot along a video timeline;
      receive input indicating a target time increment, wherein the target time increment is proportional to the first time increment; and
      generate a second digital video segment depicting the motion of the object between the start time and the end time, the second digital video segment including a plurality of sequential target frames depicting the motion in uniform time increments of the target time increment, wherein the target time increment does not comprise a multiple of the first time increment, each target frame in the plurality of sequential target frames corresponds to a target time slot along the video timeline, and a target time slot adjustment value is used to generate target frames, with each target time slot offset from at least one primary time slot by the target time slot adjustment value plus a multiple of the target time increment.

19. The system of claim 18, wherein the input related to the target time increment comprises a nonzero multiplier and the target time increment is equal to the input multiplied by the first time increment.

20. The system of claim 18, wherein at least one target frame is created based on at least two primary frames using motion estimation techniques.

21. The system of claim 18, wherein the one or more computers comprise a server operable to interact with the user interface device through a data communication network, and the user interface device is operable to interact with the server as a client.

22. The system of claim 18, wherein the one or more computers comprises one personal computer, and the personal computer comprises the user interface device.

23. The system of claim 18 wherein the target time slot adjustment value is selected such that no target frame comprises a primary frame.

\* \* \* \* \*